US012712105B2

(12) United States Patent
Guldenschuh et al.

(10) Patent No.: US 12,712,105 B2
(45) Date of Patent: Aug. 18, 2026

(54) FILLING AN ARMATURE CHAMBER IN AN ACTUATOR

(71) Applicant: ZF Friedrichshafen AG, Friedrichshafen (DE)

(72) Inventors: Dominik Guldenschuh, Freiburg (DE); Markus Moosmann, Grünkraut (DE); Markus Diesch, Bierstetten (DE); Florian Schreiber, Pfaffenhofen (DE); Ralph Wassermann, Schwaighausen (DE)

(73) Assignees: ZF Friedrichshafen AG, Friedrichshafen (DE); Magnet-Schultz GmbH & Co KG, Memmingen (DE)

( * ) Notice: Subject to any disclaimer, the term of this patent is extended or adjusted under 35 U.S.C. 154(b) by 399 days.

(21) Appl. No.: 18/300,869

(22) Filed: Apr. 14, 2023

(65) Prior Publication Data

US 2023/0335323 A1 Oct. 19, 2023

(30) Foreign Application Priority Data

Apr. 14, 2022 (DE) ......................... 102022203775.8

(51) Int. Cl.
*H01F 7/08* (2006.01)
*H01F 7/16* (2006.01)

(52) U.S. Cl.
CPC ........... *H01F 7/088* (2013.01); *H01F 7/1607* (2013.01)

(58) Field of Classification Search
CPC .. H01F 7/088; H01F 7/1607; H01F 2007/163; F16K 31/0693; F16K 31/06; F16K 27/00
(Continued)

(56) References Cited

U.S. PATENT DOCUMENTS 5,593,133 A * 1/1997 Hunnicutt ........... F16K 31/0693 137/242
6,609,698 B1 * 8/2003 Parsons ..................... F16K 7/14 251/129.17
(Continued)

FOREIGN PATENT DOCUMENTS

DE 10 2006 011 078 A1 9/2007
DE 10 2013 213 713 A1 1/2015
(Continued)

OTHER PUBLICATIONS

German-language Office Action issued in German Application No. 10 2022 203 775.8, dated Apr. 8, 2026 (7 pages).

*Primary Examiner* — Shawki S Ismail
*Assistant Examiner* — Lisa N Homza
(74) *Attorney, Agent, or Firm* — Crowell & Moring LLP

(57) ABSTRACT

An electromagnetic actuator for an assembly, in particular in a motor vehicle, may be mounted on a fluid chamber, which is designed to be connected to the actuator for fluid transfer when the actuator is installed in the assembly, which has a moving armature in an armature chamber, where the armature has a moving armature rod, where the actuator is designed to fill the armature chamber with fluid, in particular oil, in that the armature rod moves such that fluid is drawn into the armature chamber from the fluid chamber through a fluid path when the armature rod is connected to the fluid chamber for fluid transfer, and where a flow resistance in the fluid path between the armature chamber and the fluid chamber can be set to a first resistance level or a second resistance level.

18 Claims, 2 Drawing Sheets

(58) Field of Classification Search
USPC .......................................................... 335/257
See application file for complete search history.

(56) References Cited

U.S. PATENT DOCUMENTS

| | | | | |
|---|---|---|---|---|
| 2002/0117216 | A1* | 8/2002 | Ambrose | F16K 31/0689<br>137/596.17 |
| 2004/0155212 | A1* | 8/2004 | Hess | F01P 7/14<br>251/64 |
| 2006/0180782 | A1* | 8/2006 | Moreno | F16K 31/0665<br>251/129.14 |
| 2006/0284129 | A1* | 12/2006 | Krishnaswamy | F02M 47/027<br>239/585.5 |
| 2011/0147625 | A1* | 6/2011 | Speer | F16K 31/0665<br>29/890.12 |
| 2013/0032742 | A1* | 2/2013 | Scherer | H01F 7/13<br>29/602.1 |
| 2013/0099144 | A1* | 4/2013 | Buse | F16K 31/0627<br>251/73 |
| 2015/0213935 | A1* | 7/2015 | Wernau | H01F 7/081<br>335/279 |
| 2018/0363796 | A1* | 12/2018 | Grajeda | F16K 31/0655 |
| 2020/0096130 | A1* | 3/2020 | Najmolhoda | F16K 31/0675 |
| 2020/0118724 | A1* | 4/2020 | Sen | H01F 7/1607 |
| 2020/0149652 | A1* | 5/2020 | Mang | H01F 7/1607 |
| 2021/0156489 | A1* | 5/2021 | Schudt | H01F 7/06 |
| 2023/0349462 | A1* | 11/2023 | Schanuel | F16H 61/0251 |
| 2025/0095897 | A1* | 3/2025 | Battle | H01F 7/126 |

FOREIGN PATENT DOCUMENTS

| | | | | |
|---|---|---|---|---|
| DE | 10 2013 216 986 | A1 | 3/2015 | |
| WO | WO-02068850 | A1 * | 9/2002 | F16K 31/082 |

* cited by examiner

FILLING AN ARMATURE CHAMBER IN AN ACTUATOR

RELATED APPLICATION

This application claims the benefit of, and priority to, German Patent Application DE 10 2022 203 775.8, filed Apr. 14, 2022, which is hereby incorporated by reference herein in its entirety.

FIELD OF THE INVENTION

The present invention relates to an electromagnetic actuator for an assembly that has a fluid chamber, e.g. a transmission.

BACKGROUND AND SUMMARY

With conventional multi-stage motor vehicle automatic transmissions or automated motor vehicle manual transmissions, hydraulic shifting elements in the form of clutches or brakes are used to shift to different gears. A fluid pressure corresponding to the desired gear ratio is applied to or removed from (the pressure is reduced) the hydraulic shifting element in order to shift to or engage the desired gear for this. Fluid valves with electromagnetic actuators are used for this. One example of such a fluid valve is disclosed in DE 10 2013 213 713 A1.

In view of this background, the present disclosure provides an electroma actuator for an assembly, in particular in a motor vehicle, which contains a fluid chamber that is connected to the actuator for fluid transfer when the actuator is installed in the assembly, which has a moving armature with an armature rod in an armature chamber, and the actuator is designed to fill the armature chamber with fluid, specifically oil, when the armature rod moves axially, such that the fluid is drawn into the fluid chamber through a fluid path when the armature rod is connected to the fluid chamber, and the flow resistance in the fluid path between the armature chamber and the fluid chamber can be set to either a first or second resistance level.

An actuator is designed to actuate a shifting element in a transmission, and is connected to a control unit for the transmission. Actuators are the counterparts of sensors with regard to transducers, and form the actuators in a control circuit. They convert signals in a control process with which control values are set. One example of this is opening and closing a valve.

A housing is a solid shell that protects its sensitive contents, or protects the surroundings thereof from hazardous contents.

Fluids are liquids or gases. In this patent application, an appropriate fluid is oil, for example.

A fluid chamber is a chamber filled with fluid. If the fluid is an oil, the fluid chamber is referred to as an oil chamber.

When two components are connected for fluid transfer, this means that fluid can flow from one component to another component.

The flow resistance is a physical value that indicates the force in fluid dynamics that opposes the movement of the fluid.

The fundamental idea of the invention is to create a fluid path between an armature chamber in an electromagnetic actuator and a fluid chamber, in particular in an assembly in which the actuator is installed, which ensures that the actuator is filled with fluid from the fluid chamber when it is in operation. The fluid chamber can also be an additional component of the actuator.

The flow resistance in the fluid path between the armature chamber and the fluid chamber can be set to either a first or second resistance level. The flow resistance can be set to either the first or second resistance level while the actuator is in operation.

Advantageous designs and developments of the invention can be derived from the dependent claims as well as the description in reference to the drawings.

According to a preferred embodiment of the invention, the fluid path is formed at least in part by an axial hole or recess in the armature rod, a radial hole in the armature rod at the fluid chamber end, and at least one hole in the armature rod at the armature chamber end. The axial hole or recess connects the two radial holes.

The fluid path can therefore run through the armature rod (in the case of a hole) or on the surface thereof (in the case of a recess).

The radial holes are connected to the axial hole or recess at a right angle.

This design has proven to be advantageous because it requires a minimum of processing steps to obtain the fluid path.

According to a preferred embodiment of the invention, the armature rod is encompassed radially in a core at the fluid chamber end, and there is a gap between the core and the armature rod, which forms a segment of the fluid path. This results in fluid path between the fluid chamber and the armature rod that can be obtained in a particularly simple manner, without additional components.

The gap has a stepped longitudinal cross section, comprising a first step and second step, with which the first and second resistance levels are obtained when the radial hole at the fluid chamber end is at the level of the first or second step in the gap. A component adjacent to the gap, e.g. a core, can be stepped for this, thus resulting in the stepped longitudinal cross section in the gap.

If the gap has a round cross section, the steps define its diameter. This means that the gap has a first diameter at the first step and a second diameter at the second step, which is smaller than the first diameter. An axial movement of the armature rod brings it to either the first step or second step. Because the flow cross section of the fluid path is smaller at the second step that at the first step, the armature rod is choked when the hole at the fluid chamber end is at the second step, and opened when the hole at the fluid chamber end is at the first step.

According to a preferred embodiment of the invention, the fluid connection between the armature chamber and the fluid chamber can be interrupted. This prevents fluid from escaping the armature chamber while the actuator is in operation. This ensures that the armature chamber in the actuator is not drained during operation, but instead, any excess fluid ends up in another fluid reservoir via the fluid path in the armature rod.

This is obtained with a third step in the longitudinal cross section of the gap, at which the gap is extremely small, within the range of normal tolerances, e.g. zero. This third step consequently forms a cover on the hole at the fluid chamber end when this hole is at the third step.

The radial hole at the fluid chamber end is preferably at the third step when the armature rod is in its end position.

According to one preferred embodiment of the invention, the armature chamber dampens the movement of the armature rod in that the armature chamber has a first fluid reservoir and a second fluid reservoir, and the radial hole at the armature chamber end can be moved to the first fluid reservoir and the first and second fluid reservoirs are connected by a segment of the fluid path for fluid transfer.

This damping can be adjusted by adjusting the flow resistance in the fluid path between the two fluid reservoirs. If the fluid path comprises one or more holes, for example, the damping can be defined by the diameters of the holes.

The fluid path between the first and second fluid reservoirs can be obtained with an axial hole in an armature sheath encompassing armature rod in the axial direction, such that the damping is defined by the diameter of the axial hole in the armature sheath.

The armature rod can also have a first radial hole and second radial hole at the armature chamber end, which, together with the axial hole or recess, form the fluid path between the first and second fluid reservoirs.

As a result, there is no need for a choke between the first and second fluid reservoirs in order to obtain a fluid path between the two fluid reservoirs. The armature rod with which the fluid path is obtained can be drilled or milled in a processing step.

According to a preferred embodiment of the invention, the actuator is designed to fill the armature chamber with fluid in a predefined number of axial movements of the armature, in particular no more than three or two movements, more preferably exactly one movement, of the armature. This saves time.

According to a preferred embodiment of the invention, the armature chamber has a discharge gap at an end opposite the fluid chamber, with which the armature chamber can be emptied.

An exemplary actuator according to one embodiment of the invention comprises a housing, a magnetic coil that radially encompasses an interior chamber, a pole tube that extends into the interior chamber encompassed by the coil, a core that extends into the interior chamber encompassed by the coil at the end opposite the pole tube, the armature that can move axially in an armature chamber, and a bearing, in which at least the core and the pole tube form the armature chamber, and an armature sheath forms a choke between the first and second fluid reservoirs, and the armature rod is supported on the bearing, and the pole tube and the bearing form the discharge gap.

The damping of the actuator can be defined by the dimensions of the fluid path. The fluid path allows fluid to flow back and forth between the first fluid reservoir and the second fluid reservoir when the armature moves.

It is understood that an assembly for a motor vehicle, such as a transmission, cooling circuit, damping unit, etc. that has at least one electromagnetic actuator at a fluid chamber and inside the assembly, is advantageous.

It is also understood that a method for filling an electromagnetic actuator such as that described above is advantageous. The method comprises the steps, "filling the fluid chamber with fluid, or providing a fluid chamber filled with fluid," "mounting the actuator on a fluid chamber," and "starting a filling process comprising one or more axial movements of the armature in order to fill the armature chamber with fluid."

This ensures that the electromagnetic actuator is filled with fluid after it is mounted on a fluid chamber.

BRIEF DESCRIPTION OF THE DRAWINGS

The present invention shall be explained in greater detail below in reference to the exemplary embodiments illustrated schematically in the drawings. Therein.

Figure 1:
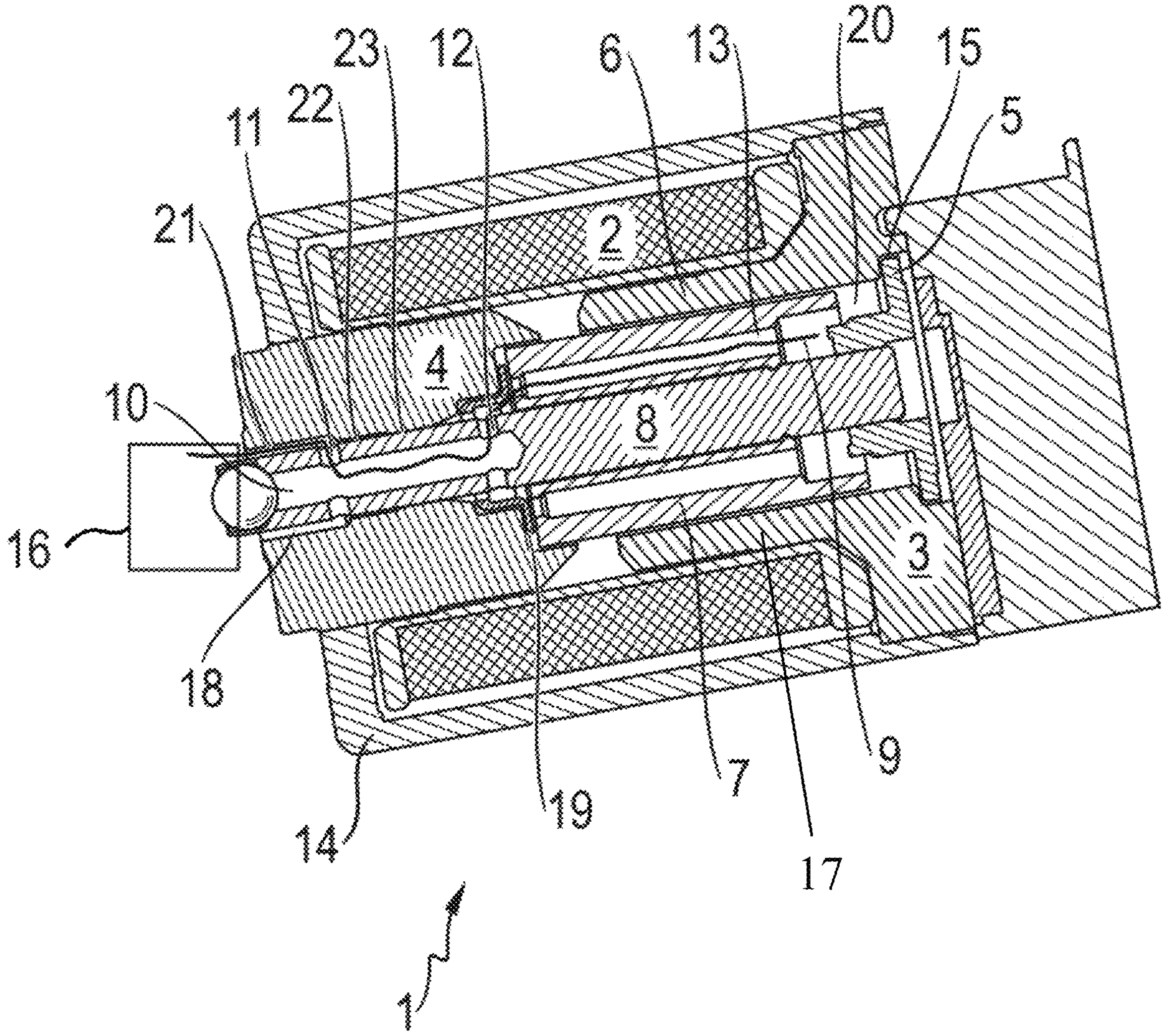
FIG. 1 shows a schematic cutaway view of an electromagnetic actuator according to one embodiment of the invention.

The drawings should provide a better understanding of the embodiments of the invention. They illustrate embodiments with which the principles and concepts of the invention are explained in conjunction with the description. Other embodiments and many of the advantages can be derived from the drawings. The elements in the drawings are not necessarily drawn to scale.

Elements, features and components in the drawings that are identical, functionally identical, and have the same functions all have the same reference symbols, unless otherwise specified.

Aspects of the invention relating to oil are referred to as fluids below. It is to be understood that the selection of oil as a fluid is merely of an exemplary nature, and does not limit the scope of protection for this patent application.

DETAILED DESCRIPTION OF THE DRAWINGS

FIG. 1 shows a schematic cutaway illustration of an electromagnetic actuator 1 that has a magnetic coil 2, a pole tube 3, a core 4, a bearing 5, an armature with a choke 7, and an armature rod 8, all of which are enclosed in a housing 14. The actuator 1 can be connected to a fluid chamber 16.

The magnetic coil 2 forms an interior chamber in the actuator with the housing 14, in which the pole tube 3 and the core 4 are located. The pole tube 3 and core 4 are axially opposite one another and delimit an armature chamber 6 in which the armature with the choke 7 and the armature rod 8 are contained. The choke 7 is formed by an armature sheath 17 in FIG. 1, which lies radially inside the pole tube 3 and the core 4. The armature rod 8 is inside the armature sheath 17 and supported on a bearing 5.

The bearing 5 forms a receiver for the armature rod 8 and lies on the pole tube 3 at a stop on the bearing 5 such that a discharge gap 15 is formed between the gap 5 and the pole tube 3, with which the armature chamber can be emptied.

When the actuator 1 is connected to the fluid chamber 16 for fluid transfer, the actuator is filled through an axial movement of the actuator 1, if it has not yet been filled. The filling takes place when a fluid, oil in this case, flows from the fluid chamber 16 into the gap 18 between the armature rod 8 and the core 4, which takes place when the hole 11 at the fluid chamber end is at the first step 21. When the hole is at the first step, the fluid path between the armature chamber and the fluid chamber is opened. At this point, the fluid flows from the gap 18 through the radial hole 11 into the axial hole 10. The fluid flows out of the armature rod 8 through the radial hole 12 and in the armature chamber 6 into the fluid reservoir 19. The fluid reservoirs 19 and 20 in the armature chamber 6 are connected by a hole 13 in the armature sheath 17.

When the armature sheath 17 moves axially, oil flows between the first fluid reservoir 19 and the second fluid reservoir 20. As a result, oil from one fluid reservoir 19, 20 passes into the other fluid reservoir 20, 19 when the oil is conveyed through segments of the fluid path 9, specifically the region between the holes 12 and 13, by the movement of the armature sheath 17.

If the armature rod 8 is raised, it is closed by the third step 23 in the core. This prevents the actuator 1 from draining when in operation.

The armature rod 8 extends along the longitudinal axis of the actuator 1 and therefore also defines the axial movement direction of the armature.

Figure 2:
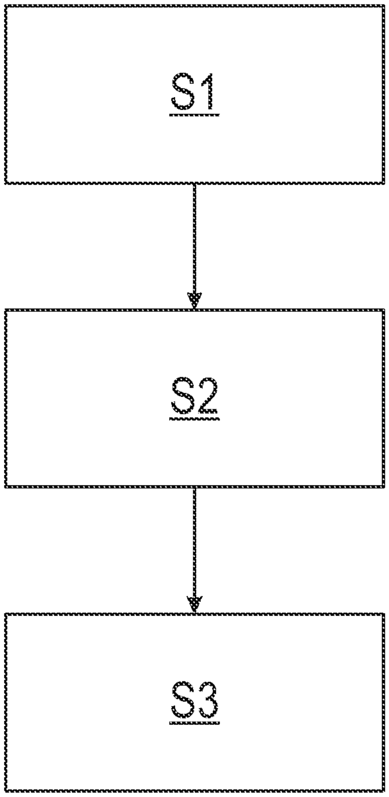
FIG. 2 shows a schematic block diagram of a method according to one embodiment of the invention.

FIG. 2 shows a schematic block diagram of a method for filling an electromagnetic actuator with oil. The method comprises steps S1 to S3. The oil chamber is filled with oil in the first step S1. The actuator is mounted on an oil chamber, in particular in a transmission, in the next step S2. The filling of the armature chamber with oil through one or more axial movements of the armature is started in the next step S3. It is to be understood that the order of the first and second steps S1 and S2 can be reversed. Instead of filling the oil chamber with oil, an oil chamber that already contains oil can be provided. This also applies to fluid chambers that contain a fluid other than oil.

REFERENCE SYMBOLS

1 actuator
2 coil
3 pole tube
4 core
5 bearing
6 armature chamber
7 choke
8 armature rod
9 fluid path
10 hole
11 hole
12 hole
13 hole
14 housing
15 discharge gap
16 fluid chamber
18 gap
19 fluid reservoir
20 fluid reservoir
21 first step
22 second step
23 third step
S1-S3 method steps

The invention claimed is:

1. An electromagnetic actuator for a motor vehicle, the electromagnetic actuator comprising:

an armature located in an armature chamber, wherein the armature has a moving armature rod, wherein the actuator is configured to fill the armature chamber with a fluid when the armature rod moves such that the fluid is drawn into the armature chamber from a fluid chamber of the motor vehicle via a fluid path when the armature rod is connected to the fluid chamber, and wherein a flow resistance in the fluid path between the armature chamber and the fluid chamber is configured to be set, via at least one radial hole in the armature rod, to either a first flow resistance level or a second flow resistance level, wherein in the first flow resistance level, a fluid communication between the armature chamber and the fluid chamber is maintained, and wherein in the second flow resistance level, the fluid communication between the armature chamber and the fluid chamber is maintained.

2. The electromagnetic actuator of claim 1, wherein the electromagnetic actuator is mounted on the fluid chamber, and wherein the fluid chamber is fluidly connected to the actuator.

3. The electromagnetic actuator according to claim 1, wherein the fluid path is formed at least in part by an axial hole in the armature rod, a radial hole at the fluid chamber end of the armature rod, and a radial hole in the armature rod at the armature chamber end.

4. The electromagnetic actuator according to claim 1, wherein the armature rod is radially encompassed by a core at the fluid chamber end, wherein a gap is located between the core and the armature rod which forms a segment of the fluid path, wherein the gap has a stepped longitudinal cross section that has a first step and a second step, with which the first and second flow resistance levels are obtained when a radial hole at the fluid chamber end is at the first or second step in the gap.

5. The electromagnetic actuator according to claim 4, wherein the longitudinal cross section of the gap also has a third step, which covers the radial hole at the fluid chamber end, and interrupts a fluid connection between the armature chamber and the fluid chamber.

6. The electromagnetic actuator according to claim 1, wherein the armature chamber has a first fluid reservoir and second fluid reservoir, wherein a radial hole at the armature chamber end is positionable at the level of first fluid reservoir and the first and second fluid reservoirs are configured to be connected for fluid transfer by a segment of the fluid path.

7. The electromagnetic actuator according to claim 6, wherein the fluid path between the first and second fluid reservoirs is obtained with an axial hole in an armature sheath that radially encompasses the armature rod, and the damping is defined in particular by the diameter of the axial hole in the armature sheath.

8. The electromagnetic actuator according to claim 6, wherein the armature rod has a first radial hole at the armature chamber end and a second radial hole at the armature chamber end, which form the fluid path with the axial hole or recess between the first and second fluid reservoirs, and the damping is defined by the diameter of the radial holes.

9. The electromagnetic actuator according to claim 1, wherein the actuator is configured to fill the armature chamber with fluid through a predefined number of axial movements.

10. The electromagnetic actuator according to claim 9, wherein the predefined number of axial movements includes less than three movements of the armature.

11. The electromagnetic actuator according to claim 9, wherein the predefined number of axial movements exactly one movement of the armature.

12. The electromagnetic actuator according to claim 1, wherein the armature chamber has a discharge gap at an end lying opposite the fluid chamber, wherein the discharge gap enables draining of the armature chamber.

13. The electromagnetic actuator according to claim 12, further comprising:

a housing;

a magnetic coil, which radially encompasses an interior chamber;

a pole tube, which extends into the interior chamber encompassed by the coil;

a core, which extends into the interior chamber encompassed by the coil and lies axially opposite the pole tube;

the armature that can move axially inside the armature chamber; and a bearing, wherein at least the core and the pole tube form the armature chamber, wherein the armature sheath for the armature forms a choke between the first and second fluid reservoirs, wherein the armature rod is supported by the bearing, and wherein the pole tube and the bearing form the discharge gap.

14. An assembly for a motor vehicle, the assembly having the fluid chamber and at least one electromagnetic actuator according to claim 1.

15. A method for filling an electromagnetic actuator with fluid, wherein the electromagnetic actuator comprising:

an armature located in an armature chamber, wherein the armature has a moving armature rod, wherein the actuator is configured to fill the armature chamber with a fluid when the armature rod moves such that the fluid is drawn into the armature chamber from a fluid chamber of the motor vehicle via a fluid path when the armature rod is connected to the fluid chamber, and wherein a flow resistance in the fluid path between the armature chamber and the fluid chamber is configured to be set, via at least one radial hole in the armature rod, to either a first flow resistance level or a second flow resistance level, wherein in the first flow resistance level, a fluid communication between the armature chamber and the fluid chamber is maintained, and wherein in the second flow resistance level, the fluid communication between the armature chamber and the fluid chamber is maintained, the method comprising:

filling the fluid chamber with fluid or installing the fluid chamber pre-filled with fluid;

mounting the actuator on the fluid chamber; and at least partially filling the armature chamber of the electromagnetic actuator via one or more axial movements of the armature.

16. An electromagnetic actuator for a motor vehicle, the electromagnetic actuator comprising:

an armature located in an armature chamber, wherein the armature has a moving armature rod, wherein the actuator is configured to fill the armature chamber with a fluid when the armature rod moves such that the fluid is drawn into the armature chamber from a fluid chamber of the motor vehicle via a fluid path when the armature rod is connected to the fluid chamber, wherein a flow resistance in the fluid path between the armature chamber and the fluid chamber is configured to be set to a first resistance level or a second resistance level, and wherein the armature chamber has a first fluid reservoir and second fluid reservoir, wherein the radial hole at the armature chamber end is positionable at the level of first fluid reservoir and the first and second fluid reservoirs are configured to be connected for fluid transfer by a segment of the fluid path.

17. The electromagnetic actuator according to claim 16, wherein the fluid path between the first and second fluid reservoirs is obtained with an axial hole in an armature sheath that radially encompasses the armature rod, and the damping is defined in particular by the diameter of the axial hole in the armature sheath.

18. The electromagnetic actuator according to claim 16, wherein the armature rod has a first radial hole at the armature chamber end and a second radial hole at the armature chamber end, which form the fluid path with the axial hole or recess between the first and second fluid reservoirs, and the damping is defined by the diameter of the radial holes.

* * * * *